United States Patent [19]

Yu

[11] Patent Number: 4,980,908
[45] Date of Patent: Dec. 25, 1990

[54] VOICE-SWITCHED GAIN CONTROL FOR VOICE COMMUNICATION EQUIPMENT CONNECTED TO TELEPHONE LINES

[75] Inventor: Wilson Yu, Concord, Mass.

[73] Assignee: Voicetek Corporation, Chelmsford, Mass.

[21] Appl. No.: 358,700

[22] Filed: May 30, 1989

[51] Int. Cl.⁵ .................... H04M 3/40; H04M 3/50
[52] U.S. Cl. ............................. 379/67; 379/89; 379/345; 379/347
[58] Field of Search ............... 379/345, 347, 406, 409, 379/89, 67, 296, 88, 404

[56] References Cited

U.S. PATENT DOCUMENTS

| | | | |
|---|---|---|---|
| 2,964,598 | 12/1960 | Parker | 379/347 |
| 3,591,735 | 7/1971 | Brooks | 379/347 |
| 3,660,603 | 5/1972 | Andersen | 379/344 |
| 4,165,449 | 8/1979 | Vachon | 379/409 |
| 4,573,140 | 2/1986 | Szeto | 364/900 |
| 4,663,777 | 5/1987 | Szeto | 379/88 |
| 4,700,382 | 10/1987 | Means et al. | 379/390 |
| 4,831,651 | 5/1989 | Vesterinen | 379/347 |

FOREIGN PATENT DOCUMENTS

| | | | |
|---|---|---|---|
| 1281499 | 10/1968 | Fed. Rep. of Germany | 379/347 |
| 0128039 | 10/1981 | Japan | 379/347 |
| 1232974 | 5/1971 | United Kingdom | 379/347 |

*Primary Examiner*—Thomas W. Brown
*Attorney, Agent, or Firm*—Rines and Rines

[57] ABSTRACT

Particularly though not exclusively for use in voice communication equipment concerned with voice storage and playback along telephone lines and having the extended networking facility for host computer-controlled direct connection between callers on a pair of lines, a method of and apparatus for improving voice quality in such a connection involving sensing the origination of voice on one of the lines and thereupon reducing signal attenuation between the lines to enable amplified gain transmission from that line to the other line of the pair, while increasing signal attenuation between the lines in the opposite direction to suppress signal communication in such opposite direction; and vice versa, when the voice signal originates on the other line.

11 Claims, 3 Drawing Sheets

VOICE-SWITCHED GAIN CONTROL FOR VOICE COMMUNICATION EQUIPMENT CONNECTED TO TELEPHONE LINES

BACKGROUND OF THE INVENTION

The present invention relates to voice communication equipment (VCE), being more particularly concerned with voice communication storage and playback systems connected with telephone lines and having facility for interconnecting the lines of a caller and subscriber for direct communication which may suffer reduced sound quality especially if routed in a circuitous manner.

Among current voice communication storage and forwarding systems adapted for simultaneous access by multiple users is the apparatus described in U.S. Pat. No. 4,573,140 issued to the common assignee of the present application, Voicetek Incorporated, and earlier patents referenced therein. The adaptation of such to enable more extended communication networking and an expanded mode of operation under the control of a host computer, to permit the voice communication equipment to "outdial", wherein a caller on an incoming line may be routed for direct connection with a party responding on a second line, is described. U.S. Pat. No. 4,663,777 also issued to the common assignee of the present application.

Such extended-communication modes of operation, however, suffer from problems also inherent in more general telephone networking, particularly when a call is routed in a way not generally anticipated by the network—for instance, a credit-card call from Newark airport to the credit card verification center in Kansas City for a called number in New York city—the extra distance resulting in poor sound quality that requires further signal amplification. For the use of such extended telephone networking with voice communication equipment (VCE), however, the problem is not simple. Ideally, every VCE sold should be capable of introducing such signal improvement, since traditional methods of boosting the signal involve complex and expensive devices, totally unacceptable to the market for voice communication equipment with storage and playback facilities.

SUMMARY OF THE INVENTION

An object of the present invention, accordingly, is to provide a new and improved method of and apparatus for voice communication storage and playback incorporating the said extended communication networking feature of "out-call" mode wherein a caller on one line may be directly connected to a party on another line, and in which a voice-switched gain control technique is employed to obviate the amplification problem, among others, in such "out-dial" line connections, and with simple and inexpensive apparatus that provides no disruption of the normal operation of the VCE circuitry and optimizes the preservation of natural, high-quality speech transmission.

A further object is to provide a novel voice-switched gain control apparatus of more general utility as well.

Other and further objects will be explained hereinafter and are more particularly delineated in the appended claims.

In summary, however, from one of its importantt aspects, the invention, particularly as incorporated in a VCE as before described, embodies in a voice communication and routing system in which speech signals originating on a first telephone line are amplified as coupled to a second telephone line while suppressing a signal transmission in the reverse direction, and vice versa, a method of voice-switched signal gain control, that comprises, coupling amplifiers respectively connected to the first and second telephone lines together; under no-talk conditions, introducing a predetermined level of attenuation between the line amplifiers; sensing the origination and direction of voice signal communication from the first to the second or the second to the first telephone line; responding to said sensing to reduce the predetermined level of signal attenuation between the line amplifiers in the appropriate direction from the signal-originating line to the other line, while simultaneously increasing the signal attenuation in the opposite direction, resulting in net amplification gain and transmission of the signal in the said appropriate direction and net attenuation and signal suppression of the signal in the opposite direction; returning the attenuation to said predetermined level upon the cessation of speech from the originating line; and switching the directions of the reduction and increase in attenuation upon the sensing of voice originating on said other line. Preferred and best mode apparatus and details for implementing the invention are later presented.

BRIEF DESCRIPTION OF THE DRAWINGS

The invention will now be described in connection with the accompanying drawings, FIGS. 1 and 2 of which are block diagrams illustrating a generalized host-computer-controlled VCE of the character earlier described and its specific application to an "out-dial" mode for an illustrative credit-chard check line connection, respectively.

DESCRIPTION OF THE PREFERRED EMBODIMENTS

Figure 1:
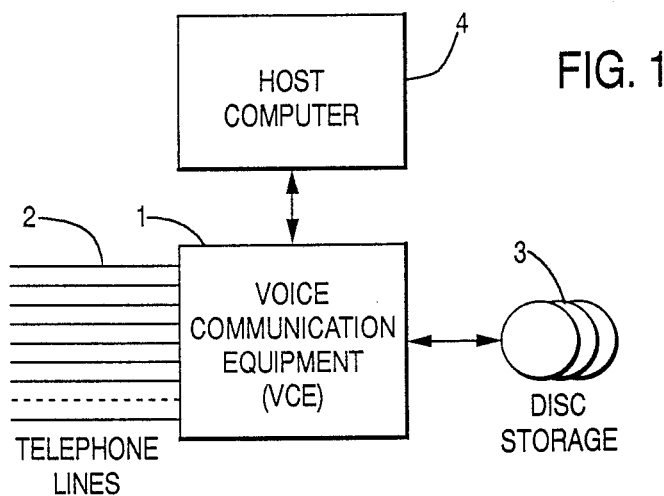

Referring to FIG. 1, the before-mentioned VCE system (1), as of the type described in said U.S. Pat. No. 4,573,140, for example, is shown connected to a number of telephone lines (2), a host computer (4), and one or more magnetic storage disks (3). The VCE, under control of the host computer, uses the disks to store incoming voice messages from the telephone lines and playback recorded messages as is well known and as is described in the patent. A number of callers (typically up to 32, for example) can simultaneously place and receive messages, using the system either as a centralized telephone-answering equipment (so-called "voice-mail" application), or as an assembly of pre-recorded messages which provide information available from a data base in the host computer to the caller (a so-called voice-response application). In some cases, a combination of these two applications may be used.

Figure 2:
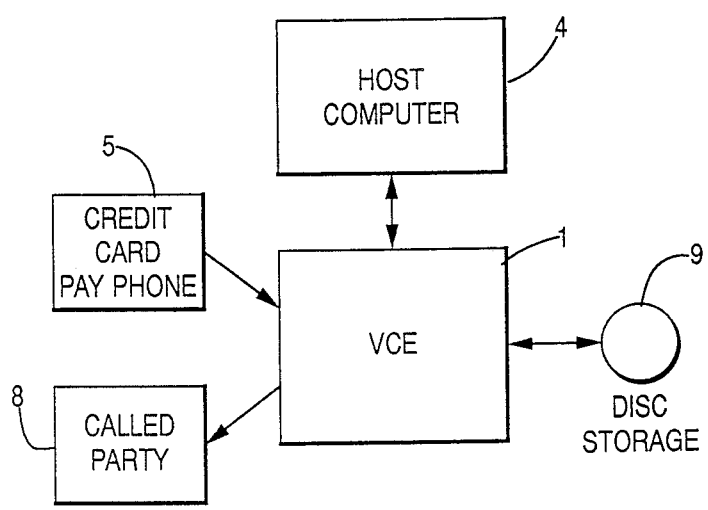

As before stated, the concept can be expanded in a significant way by using the VCE as a link in a more extended communication network having the ability to "outdial". The equipment can accept an incoming call, accept direction from the caller, outdial a number, and even connect the calling party directly to the outdialed party as described in said U.S. Pat. No. 4,663,777. An important example of such an application—credit check on calls initiated from credit card actuated pay telephones—is shown in FIG. 2. When a caller passes the magnetic-strip coded telephone credit card through the reader of the pay telephone (5), the call is directed to the VCE (1). The VCE, under control of the host computer with its data base (4), can thus verify the credit card. If verified, the VCE outdials the number entered (and recorded) from the caller and connects the caller to the called number (8). If the credit card cannot be verified, the VCE can generate an appropriate message to the caller from the disk (9). Clearly, many other applications are useful including the use of a number of related data bases available on different computers at different locations with differnet telephone numbers for their dial-up ports. The VCE can be used to route an incoming call to the appropriate data base, on the basis of prompts from the VCE and response from the caller passed to the VCE by "touch-tone" signals from the caller.

Figure 3:
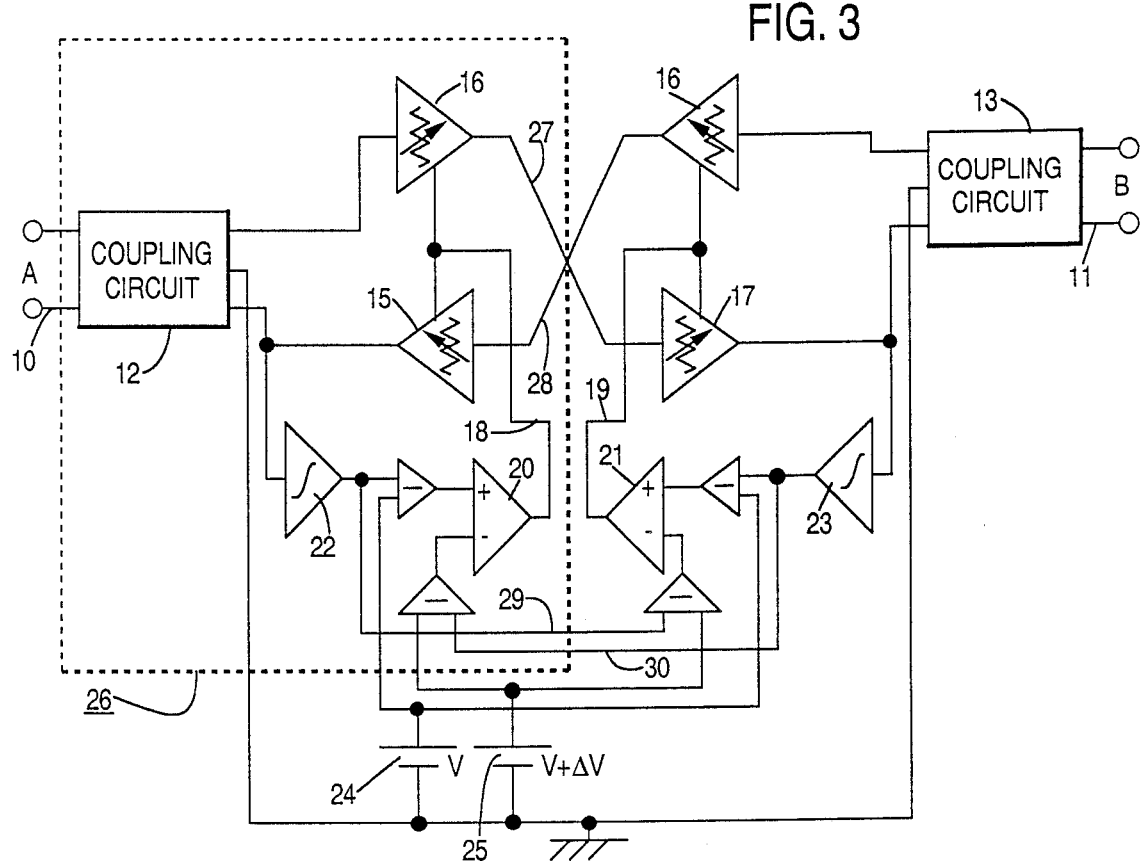
FIG. 3 is a more detailed circuit diagram illustrating the practice of the method underlying the invention, in preferred though idealized form, of enabling high-quality speech transmission through attenuation-network and amplificaton control in the coupling of an originating call with a second line.

To solve the before-described problem of degraded signal quality, particularly in such out-dailed connections and the like, the technique and apparatus of the invention provide for circuitry integrated into the VCE equipment without disruption of the normal operation of the circuitry, involving a novel use of attenuator chips heretofore used in speaker phone applications and that provide simplicity and economy. The parameters of the control circuitry are optimized to preserve natural speech transmission with appropriate sensitivity for sensing the direction of communication, which is particularly important in this respect for the purposes of the invention as will now be explained in connection with the circuit diagram of FIG. 3, illustrating a preferred circuit for improving the sound quality of the signal, in idealized form.

Telephone line A (10) is connected to telephone line B (11) through the respective identical amplifier coupling circuits (12) and (13) and variable attenuators (14), (15), (16), and (17). THe attenuators are controlled by signals on control lines (18) and (19); these control signals being generated by the circuitry shown in the lower half of FIG. 3.

The identical coupling circuits (12) and (13) use conventional telephone technology to provide a "two-wire to four-wire" connection, allowing speech signals originating on telephone line A to pass to the line connected to attenuator (14), and then through attenuator (17), through coupling circuit (13), to telephone line B. In accordance with the invention, the coupling circuit (13) does not allow the signal originating at A to appear on the line from coupling circuit (13) to attentuator (16), however, even though it appears on telephone line B. The coupling circuit may thus provide amplification of the speech signal without introducing an unstable condition which would cause "singing" on the telephone lines. Speech signals originating on telephone line B are similarly passed to telephone line A with amplification in the opposite direction, using the same technique.

The conventional technology employed by the coupling circuit is often inadequate, however, and when significant amplification of the speech signal is introduced, singing and echoes are present. These effects are eliminated in accordance with the present invention by using the phenomenon that only one party will be speaking at one time; that is, speech signals will originate either at A or B, but not simultaneously. The circuit described in this invention allows amplified transmission of speech signal only in a direction (A-to-B or B-to-A) depending on the origin of the speech signal, with the speech signal in the opposite direction being simultaneously suppressed.

This differential transmission is introduced by the attenuators (14) through (17) inserted in the speech signal paths following amplification of the signals in the coupling networks. The attenuators are controlled by the control lines (18) and (19) which provide either a high (say +5 V) or a low (0 V) signal. The particular values of attenuation (expressed in db) assumed by the attenuators upon application of a high or low control signal may be varied to accommodate whatever telephone line conditions exist. Under typical operating conditions, for example, a high signal may set both the upper attenuator to about 13.75 db and the lower attenuator to 8.85 db; with a low signal setting the upper atenuator to about 8.75 db and the lower attenuator to 12.5 db, as examples.

If there is no speech signal on either telephone line A or B (no-talk situation), both control lines are low. If speech transmission originates at line A, control line (18) remains low and control (19) goes high. If speech transmission originates at line B, however, control line (19) remains low and control line (18) goes high.

The following table summarizes the settings of the attenuators under such typical exemplary conditions:

| Speech Condition | Attenuator Setting in db | | | |
|---|---|---|---|---|
| | 14 | 15 | 16 | 17 |
| No Talk | 8.75 | 12.50 | 8.75 | 12.50 |
| A to B | 8.75 | 12.50 | 13.75 | 8.85 |
| B to A | 13.75 | 8.85 | 8.75 | 12.50 |

Thus under no-talk conditions, a total attenuation of 21.25 db occurs in both channels. If speech originates at line A (A-to-B condition), attenuation in the A-to-B direction is 17.60 db and attenuation in the B-to-A direction is 26.25 db. Under B-to-A conditions, the opposite prevails. The action of the attenuators, together with the amplification in the coupling circuits, results in net amplification of the signal in the appropriate direction and net attenuation of the signal in the opposite direction.

The control lines are set, in the preferred form of the circuit, by comparators (20) and (21) which, in turn, are controlled by rectifier/integrator (R/I) circuits (22) and (23) and corresponding reference voltages (24) and (25). The R/I circuits rectify and smooth the speech signal present at the attenuator outputs over a brief period, thus providing a signal representative of speech volume over this period. The R/I circuit (22) develops a signal representative of the speech volume sensed at the output of attenuator (15). This signal is added to reference voltage (24) and applied to the positive input of the comaprator (20). The signal is also added to the reference voltage (25) and applied to the negative input of comparator (21). The R/I circuit (23) similarly develops a signal representative of the speech volume sensed at the output of attenuator (17) and this signal is added to reference voltage (24) and applied to the positive input of the comparator (21). The signal is also added to the reference voltage (25) and applied to the negative input of comparator (20).

Under no-talk conditions, accordingly, only a small signal will be developed at the output of the R/I circuits corresponding to the background noise on the telephone lines A and B. Reference voltage (25) is slightly higher (V+ΔV) than the reference voltage V at (24). Background noise, however, produces an output from R/I of less than ΔV, so that the negative input of the comparators is higher than the positive input and the output of both comparators is low, establishing the no-talk setting of the attenuators as exemplarily tabulated above.

If a speech signal now originates on telephone line A, the voltage signal from R/I (23) will become greater than ΔV, causing the output of comparator (21) to go high. The same signal from R/I (23) is added to the reference voltage (25) and applied to the negative input of comparator (20), reinforcing its output in the low state. The transmission mode is now established, as in the table, above. In response to the voice signal at A, the system is thus switched to provide amplified signal gain in the direction A-to-B, while simultaneously disabling reverse direction communication by high attenuation in that direction.

When the speech signal on telephone line A disappears, the circuit returns to the no-talk condition; and if, now, speech originates on telephone line B, R/I circuit (22) takes over control, switching to the B-to-A transmission mode as also tabulated in the above table.

Figure 4:
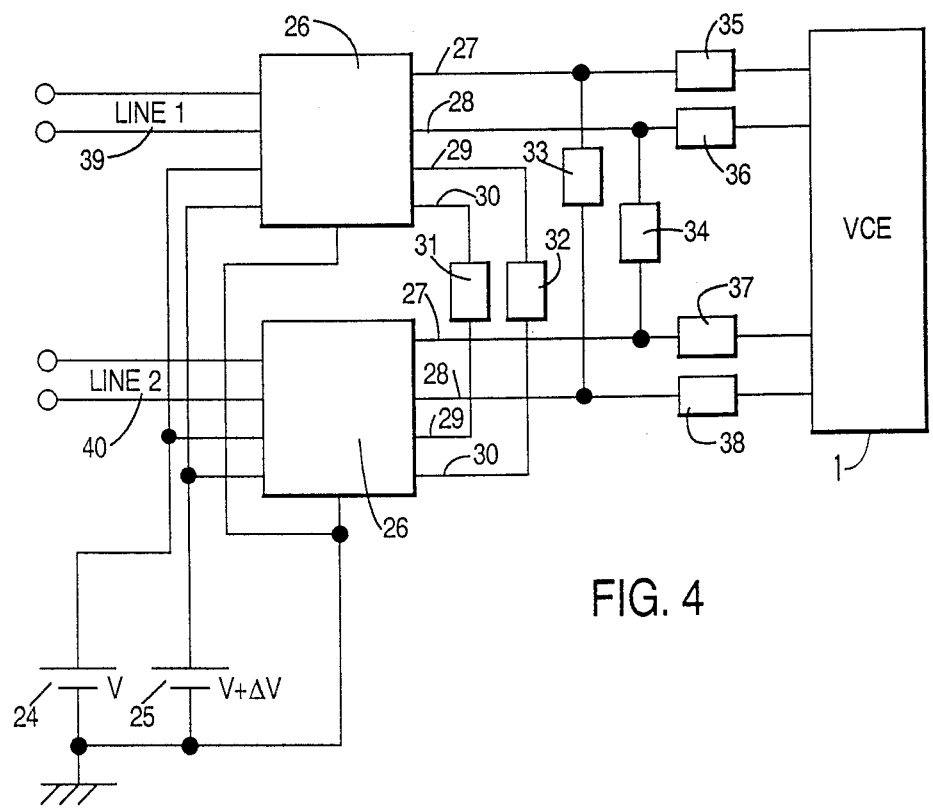
FIG. 4 is a similar circuit diagram illustrating the embodying of the system of FIG. 3 into a VCE system.

In FIG. 4, the circuit (26) of FIG. 3 is shown integrated into the VCE system (1). Each telephone line entering the VCE is equipped with the circuit (26) of FIG. 3 and paired with another line. Telephone line 1 (39) is paired with telephone line 2 (40) by means of circuits (26) and analog switches (31) through (38) which connect the lines (27) through (30) of circuit (26). When the equipment is used to connect telephone lines to the VCE, the interconnection of the telephone lines is disabled by opening switches (31) through (34) and closing switches (35) through (38). When line 1 is to be connected to line 2 with the speech amplification feature of the invention active, switches (31) through (34) are closed and switches (35) through (38) are opened. These switches are actuated by the VCE when commanded by the host computer.

Figure 5:
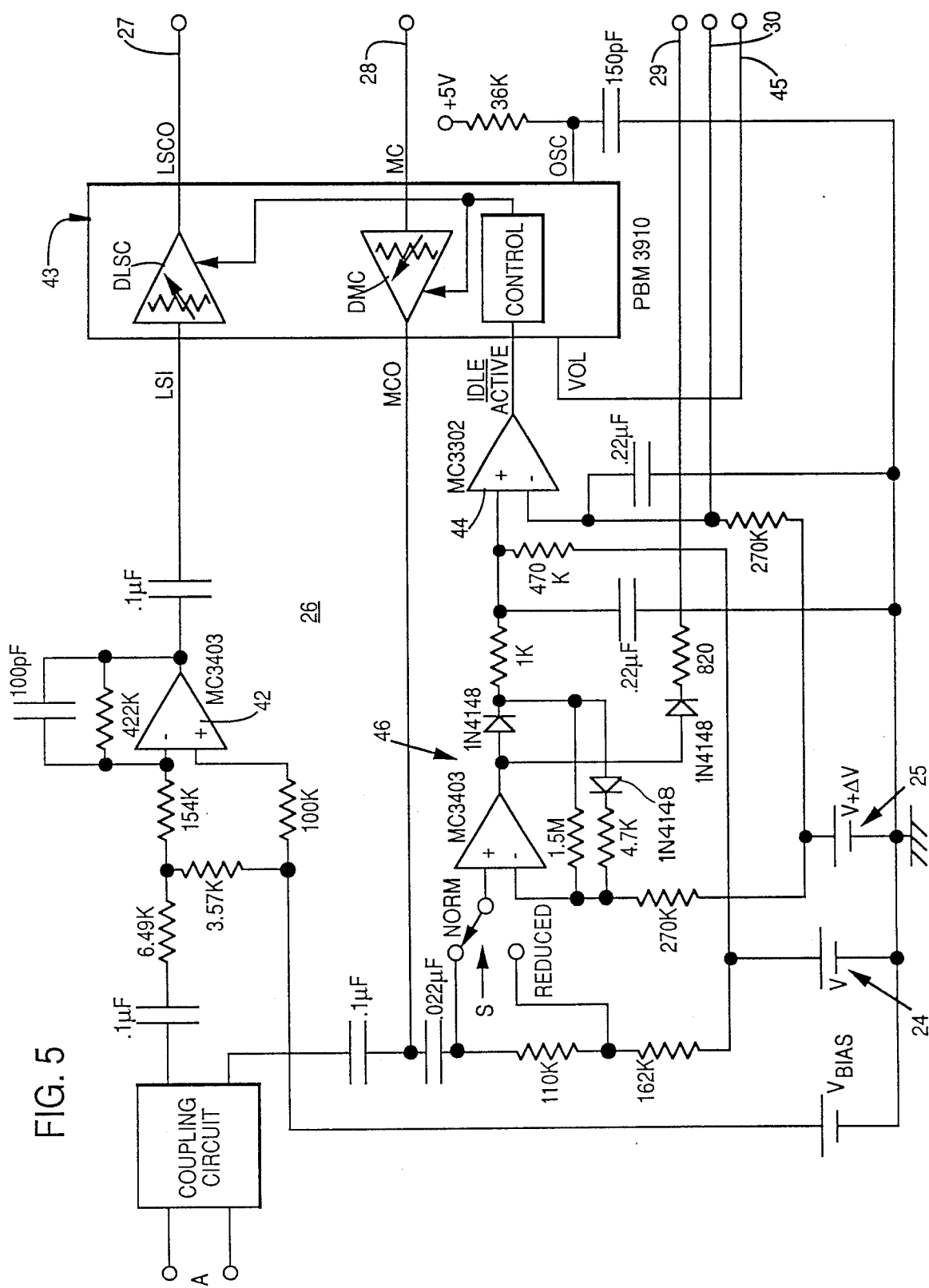
FIG. 5 is a preferred circuit implementation for use in FIG. 4.

A suitable illustrative detailed circuit diagram for the circuit (26) is presented in FIG. 5, with conventional power supply connections and unused connections not shown, but with circuit values and preferred component types delineated. Amplifier (42) (e.g., Motorola model MC 3403) together with its associated circuitry provides isolation from the coupling circuit with unity gain. The attenuators are provided by the chip (43), as of the type used in speaker phone equipment, though employed in a novel manner herein (e.g., model PBM 3910 of Rifa AB, Stockholm, Sweden). The loud speaker control attenuator (deonted by DLSC) of the illustrative chip (43) is used as attenuator (14) in FIG. 3, feeding line (27); the microphone control attenuator (denoted by DMC) is used as attenuator (15) in FIG. 3, receiving its input from line (28). The control signal to the attenuator chip is provided by comparator (44) and its associated circuitry. It should be noted that the no-talk situation or A-to-B mode provides an "active" signal to the control input; the B-to-A situation provides an "idle" signal to the control.

The volume control of attenuator chip (43) is set by a voltage control provided by line (45). This control establishes the amount of attenuation introduced and is set for the particular line conditions which the equipment faces. The circuitry associated with the OSC input to the chip sets the amount of time required for the chip to respond to a change in state at the control input. It must respond rapidly if natural speech transmission is to be preserved.

The R/I circuit (46) provides the speech signal level used with reference voltages V (24) and V+ΔV (25) to actuate the comparator as described above in connection with FIG. 4. The R/I circuit also provides the signal to line (29) to the comparator in the complementary circuit as shown in FIG. 3. The corresponding signal from the complementary circuit to comparator (44) is provided by line (30). The R/I circuit is designed to retain the speech direction in the appropriate direction for a very brief pause (10-20 msec) after the speaker stops. This delay prevents the loss of suffix information at the end of a statement, thus preserving natural speech transmission. A switch (s) is provided to reduce the sensitivity of the circuit in case line conditions are better served in this mode.

The before-mentioned preferred circuit component values and types listed alongside the components in FIG. 5 for the circuit 26 are particularly suited for the type of line connection applications illustratively presented in FIG. 2.

Further modifications will also occur to those skilled in this art, and such are considered to fall within the spirit and scope of the invention as defined in the appended claims.

What is claimed is:

1. In a voice communication and routing system in which speech signals originating on a first telephone line are amplified as coupled to a second telephone line while suppressing signal transmission in the reverse direction, and vice versa, a method of voice-switched signal gain control, that comprises, coupling line amplifiers respectively connected to the first and second telephone lines together; under no-talk conditions, introducing a predetermined level of attenuation between the line amplifiers; sensing the origination and direction of voice signal communication from the first to the second or the second to the first telephone line by monitoring the attenuated signal resulting from each line over a brief period of time to provide signals representative of speech volume present on the respective lines over a brief period of time to provide signals representative of speech volume present on the respective lines over such period and by comparing the monitored signals; responding to said sensing to reduce the signal attenuation between the line amplifiers in the appropriate direction from the signal-originating line to the other line, while simultaneously increasing the signal attenuation in the opposite direction, resulting in net amplification gain and transmission of the signal in the said appropriate direction and net attenuation and signal suppression of the signal in the opposite direction; returning the attenuation to said predetermined level upon the cessation of speech from the originating line; and switching the directions of the reduction and increase in attenuation upon the sensing of voice originating on said other line.

2. A method as claimed in claim 1 and in which the attenuation between the lines is electronically controlled in response to said comparing.

3. A method as claimed in claim 1 and in which said telephone lines are switched alternatively either to connect to one another with voice-switched signal gain control as aforesaid or to connect to speech signal message storage and playback means of said voice communication and routing system for speech signal message storage and playback.

4. Voice communication and routing apparatus, comprising voice communication equipment with host computer and disc storage means for enabling a voice message storage and playback mode of operation along telephone lines connected to said equipment, and, under the control of the host computer, for enabling operation in a different mode connecting a selected pair of the telephone lines together, and a voice-switched gain control between said selected pair of telephone lines, said voice-switched gain control including line amplifying means connected to each selected line and coupling to one another through variable attenuation means, means for controlling the attenuation means to a predetermined level of attenuation between the line amplifying means under no-talk conditions, means for sensing the origination and direction of voice signal communication from one selected line to the other, means responsive to said voice signal origination sensed by the sensing means for controlling the attenuation means to reduce the signal attenuation between the line amplifying means in the appropriate direction from the signal-originating selected line to the other selected line, while simultaneously increasing the signal attenuation in the opposite direction, resulting in net amplification gain and transmsission of the signal in the said appropriate direction and net attenuation and signal suppression of the signal in the opposite direction, means responsive to sensing of the cessation of voice signal for controlling said attenuation means to return to said predetermined level of attenuation, and means responsive to sensing by said sensing means of voice signal origination on said other selected line for controlling said attenuation means to switch the directions of the reduction and increase in attenuation.

5. Apparatus as claimed in claim 4 and in which means is provided, controlled by said host computer, for connecting said pair of telephone lines to said voice communication equipment for operation in said voice message storage and playback mode, with the connection between said pair of telephone lines disabled.

6. Apparatus as claimed in claim 4 and in which said sensing and controlling means include means for monitoring a respective attenuated signal resulting in the attenuation means from each selected line over a brief period of time to provide signals representative of speech volume present on the respective selected lines over such period, and comparator means for comparing the signals monitored by said monitoring means to determine said appropriate direction upon speech originating on one of the selected lines, the comparator means providing an output appropriately controlling said attenuation means.

7. Apparatus as claimed in claim 6 and in which said monitoring means comprises rectifier-integrator circuits and reference voltage means for rectifying and smoothing said signals representative of speech volume, with only a small signal resulting from the rectifier-integrator circuits under no-talk conditions corresponding to the background noise on the selected telephone lines establishing the no-talk predetermined level of attenuation of said attenuation means.

8. Apparatus as claimed in claim 4 and in which said predetermined no-talk attenuation level between the selected lines is of the order of 21.25 db; and the reduced attenuation in the direction from the voice-signal originating line is of the order of 17.60 db and the increased attenuation in the opposite direction is of the order of 26.25 db.

9. Apparatus as claimed in claim 7 and in which delay means is provided in the rectifier-integrator circuits for preserving suffix speech information at the end of speech on the signal-originating selected line.

10. Apparatus as claimed in claim 4 and in which said voice-switched gain control includes means for preserving suffix speech information at the end of speech on the signal-originating selected line.

11. In a voice communication and routing system in which speech signals originating on a first telephone line are amplified as coupled to a second telephone line while suppressing signal transmission in the reverse direction, and vice vesa, a method of voice-switched signal gain control, that comprises, coupling line amplifiers respectively connected to the first and second telephone lines together; under no-talk conditions, introducing a predetermined level of attenuation between the line amplifiers; sensing the origination and direction of voice signal communication from the first to the second or the second to the first telephone line; responding to said sensing to reduce the signal attenuation between the line amplifiers in the appropriate direction from the signal-originating line to the other line, while simultaneously increasing the signal attenuation in the opposite direction, resulting in net amplfiication gain and transmission of the signal in the said appropriate direction and net attenuation and signal suppression of the signal in the opposite direction; returning the attenuation to said predetermined level upon the cessation of speech from the originating line; and switching the directions of the reduction and incease in attenuation upon the sensing of voice originating on said other line; and wherein said telephone lines are switched alternatively either to connect to one another with voice-switched signal gain control as aforesaid or to connect to speech signal message storage and playback means of said voice communication and routing system for speech signal message storage and playback.

* * * * *